United States Patent [19]

Nagata et al.

[11] Patent Number: 4,594,663
[45] Date of Patent: Jun. 10, 1986

[54] CREDIT TRANSACTION PROCESSING SYSTEM

[75] Inventors: Masanori Nagata, Kyoto; Toshiaki Inoue; Mamoru Hirayama, both of Takatsuki, all of Japan

[73] Assignee: Omron Tateisi Electronics Co., Kyoto, Japan

[21] Appl. No.: 512,022

[22] Filed: Jul. 8, 1983

[30] Foreign Application Priority Data

Jul. 9, 1982 [JP] Japan ................................ 57-120070

[51] Int. Cl.$^4$ ............................................. G06F 15/30
[52] U.S. Cl. .................................... 364/401; 364/406; 364/408; 235/380; 235/382.5
[58] Field of Search ............................... 364/400–401, 364/405–406, 408; 235/375, 378–382, 382.5

[56] References Cited

U.S. PATENT DOCUMENTS

| | | | |
|---|---|---|---|
| 4,055,746 | 10/1977 | Peterson | 364/401 X |
| 4,091,448 | 5/1978 | Clausing | 235/379 X |
| 4,172,552 | 10/1979 | Case et al. | 235/380 |
| 4,271,351 | 6/1981 | Bloodworth | 235/375 |
| 4,359,630 | 11/1982 | Simonotti et al. | 235/379 |
| 4,395,626 | 7/1983 | Barker et al. | 235/381 |
| 4,472,626 | 9/1984 | Frid | 235/379 |
| 4,485,300 | 11/1984 | Peirce | 235/380 |

FOREIGN PATENT DOCUMENTS

| | | | |
|---|---|---|---|
| 2011671A | 7/1979 | United Kingdom | 364/401 |
| 2083259A | 3/1982 | United Kingdom | 364/401 |

*Primary Examiner*—Gary V. Harkcom
*Attorney, Agent, or Firm*—Schwartz, Jeffery, Schwaab, Mack, Blumenthal & Evans

[57] ABSTRACT

A credit transaction processing system processes data related to a commodity entered into by using a card (17) owned by a customer and a recording card (16) owned by a store. First, merchant transaction data necessary for a credit sale stored in the recording medium (16), such as account number data for the store, data specifying a credit company, and data representing an upper limit of an amount to to be sold through a credit sale, are read by a card reader (5), and then, customer transaction data stored in the customer's recording card, such as account number data of the customer, data specifying a credit company and an identification number or code is read. If and when the customer enters his identification number by a ten-key (7), a central processing unit (12) determines whether the entered identification number coincides with the identification number read out of the customer's card. If and when a coincidence occurs, it is determined whether data indicating the purchase price of the commodity purchased by the customer is lower than the upper limit of the amount to be sold through a credit sale. If so, the price data is transmitted to a center station (3) and the amount of the money required for the credit sale is transferred from the bank account of the credit company utilized by the customer to the bank account of the store.

5 Claims, 9 Drawing Figures

FIG. 2

| |  |
|---|---|
| CONTENT RECORDED IN THE CARD | 131 |
| UPPER LIMIT OF AN AMOUNT TO BE SOLD | 132 |
| CODE REPRESENTING A CUSTOMER | 133 |
| SOLD AMOUNT | 134 |

FIG. 3

| KIND OF CARD (161) | BK CODE (162) | C CODE (163) | CREDIT SALE CODE (164) |
|---|---|---|---|
| B1 | b1, b1, b1 | C1 | 0 |
| B2 | b2, b2, b2 | C2 | 1 |
| B3 | b3, b3, b3 | C3 | 0 |
| B4 | b4, b4, b4 | C4 | 1 |
| ⋮ | ⋮ | ⋮ | ⋮ |
| Bn | bn bn bn | Cn | 0 OR 1 |

FIG. 4

| KIND OF CARD (171) | BK CODE (172) | C CODE (173) | IDENTIFICATION CODE (174) |
|---|---|---|---|
| A1 | a1, a1, a1 | C1 | X X X X |
| A2 | a2, a2, a2 | C1 | Y Y Y Y |
| A3 | a3, a3, a3 | C1 | Z Z Z Z |
| ⋮ | ⋮ | ⋮ | ⋮ |
| An | an, an, an | Cn | $Z_{n-2}, Z_{n-2}, Z_{n-2}$ |

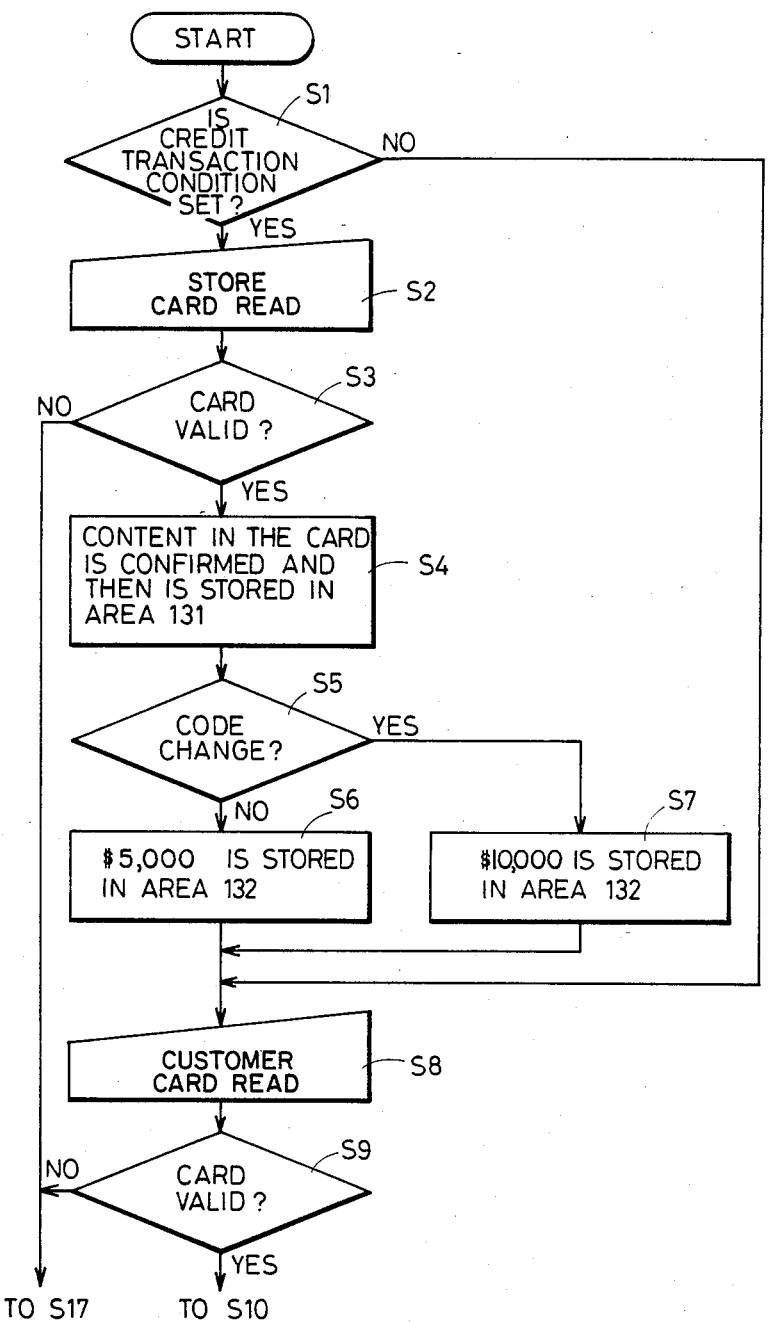

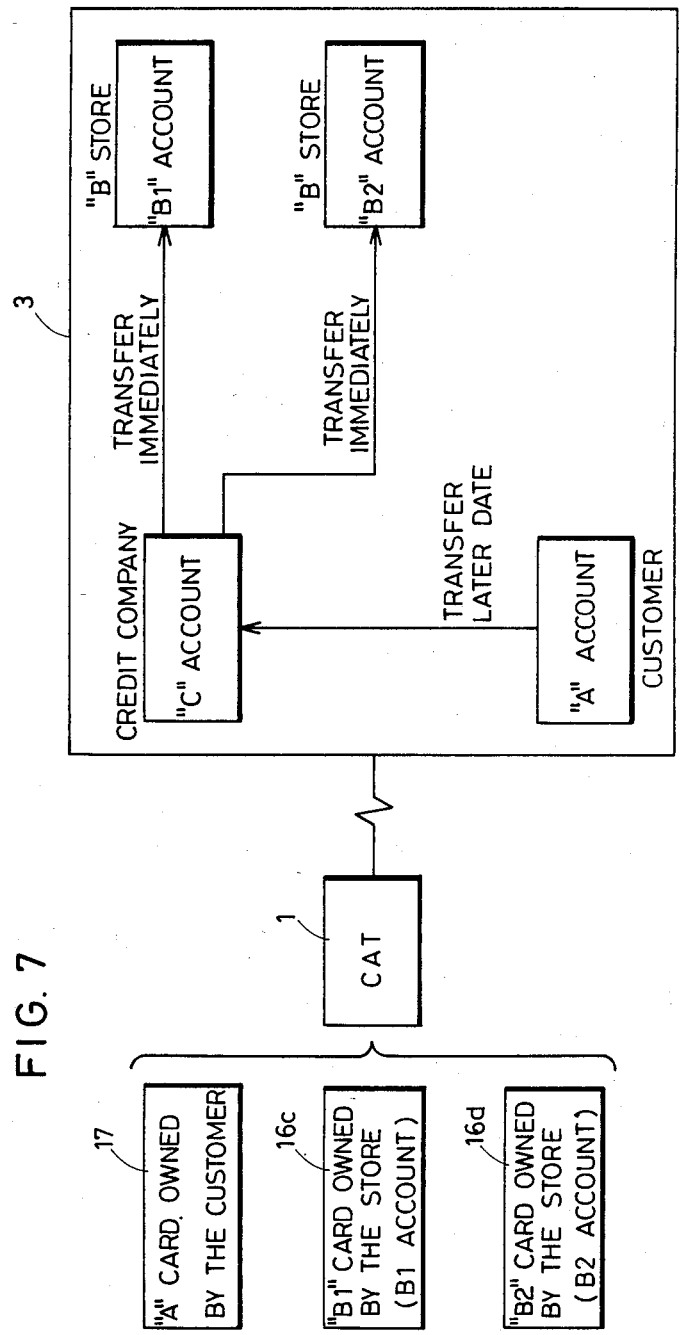

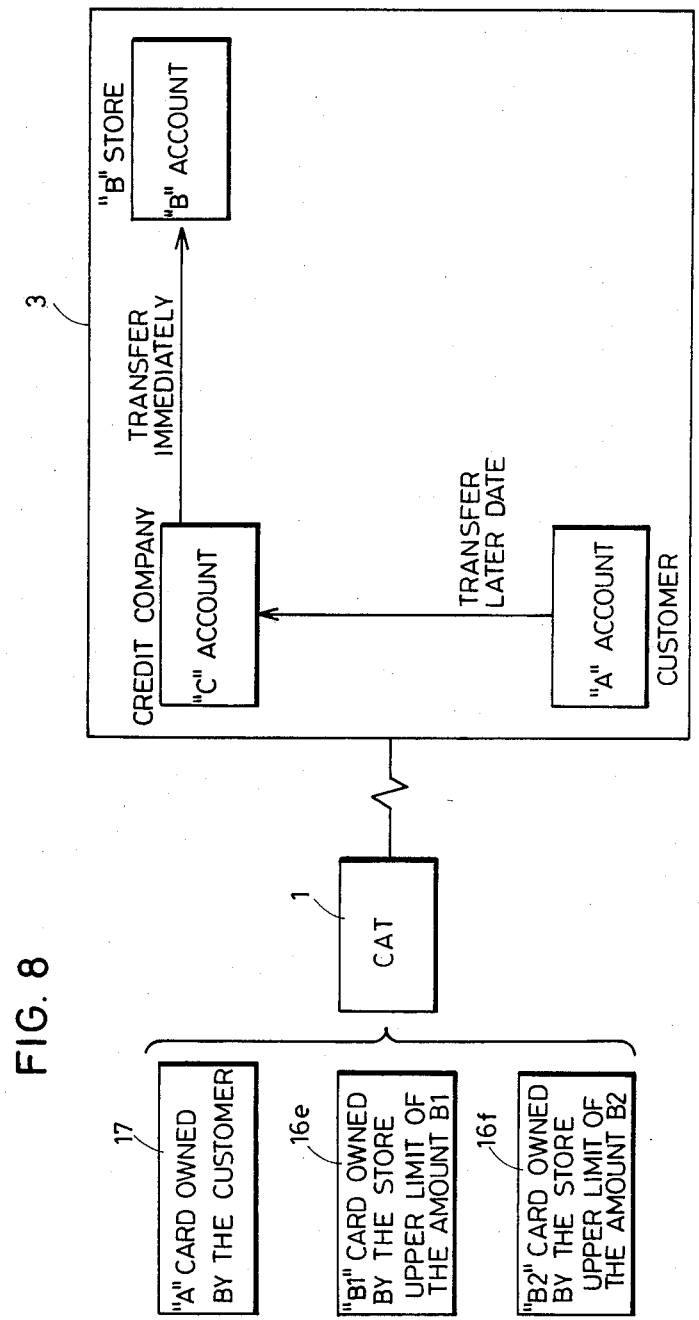

CREDIT TRANSACTION PROCESSING SYSTEM

BACKGROUND OF THE INVENTION

1. Field of the Invention

The present invention relates to a credit transaction processing system. More particularly, the present invention relates to a credit transaction processing system wherein a credit sale (including cash dispensing) of a commodity is made by using a customer's card so that a transfer processing of an amount sold is made.

2. Description of the Prior Art

In recent years, the number of people who utilize a so-called credit card is increasing. A credit sale using a credit card is typically effected by mere presentation of a credit card to a store, the store then permitting the customer to purchase a commodity or commodities from the store or to have his meal out without paying cash at that time. Instead, the amount required for purchasing the commodity and the like is automatically transferred from a banking institution where the customer holds an account, at a later date.

A current credit sale system comprises a credit company, a member store and a customer who utilizes a credit card. In case where a customer purchases commodities and the like at a member store by using a credit card, a card number thereof is written or imprinted on two sheets of paper, for example, by a particular machine at the store, one sheet of paper being given the customer as a receipt and the other sheet of paper being left in the store with the signature of the customer. The other sheet of paper left in the store is forwarded to a credit company and correspondingly, the store receives from the credit company the money corresponding to the price of the commodity purchased by the customer. The reception of the money is generally made by electronic fund transfer, by a credit company, of the required amount of money to an account in a predetermined banking institution designated by the store. The credit company automatically receives, at a later date, the money through a transfer from the bank account of the customer who purchased the commodity by using the credit card.

On the other hand, if and when the store sells commodities to a customer through a credit sale, in principle, the credit sale is not permitted exceed an upper limit of an amount which is predetermined, in advance, by a contract between the credit company and the store and, if an amount of a credit transaction exceeds the upper limit, the store contacts the credit company by way of a telephone, for example, and makes a sale only after obtaining an approval of the credit company. The reason is that, if the amount to be transferred from a predetermined account of the customer is not deposited in the predetermined account of the customer, the credit company who will be liable to the store the price of the commodities purchased by the customer incurs a risk of nonreimbursement from the customer to the detriment of the credit company. Thus, in order to avoid such risk or in order to reduce the damage to a minimum even if the damage occurs, an upper limit of the amount to be sold through a credit sale is predetermined. If an attempted credit sale exceeds the upper limit, it can then be determined whether the credit sale should be made or not, depending on the past records of the customer, the amount deposited in his bank account and the like.

In addition, in order to prevent a credit sale to a suspended customer who has demonstrated himself a bad credit risk, a credit company distributes to member stores a list enumerating the names of suspended customers and instructs the stores not to make credit sales to the customers enumerated on the list. However, it is necessary for a store clerk to check manually the list whenever a credit sale is made. Particularly, such checking is very time consuming due to an increase of frequency in the credit sales. Thus, it often occurs that the store neglects such checking of the list.

In order to expedite this process, an on-line communication between a credit company and each member store is established so that it can rapidly be determined whether a customer is suspended or not, by using a customer's card.

However, in such a case, a terminal for each credit company must be installed in each store and thus, in case of a store making a contract with a plurality of credit companies, the store must install a plurality of terminals. In addition, the money to be transferred from the credit company to each store as the price for the commodities sold by the store is transferred to a particular account of a banking institution designated by the credit company and the store. The store is not permitted to change arbitrarily the account depending on the kind of commodities to be sold, for example. Furthermore, the account number of the store is determined depending on the terminal and cannot be changed, If the store moves, a subsequent store at the same location cannot use the terminal as originally installed in the store and thus the terminal must be moved together with the transfer of the business or the change of the place of business. Department stores and large scale supermarkets often move.

SUMMARY OF THE INVENTION

A principal object of the present invention is to provide a credit transaction processing system with flexibility of credit transaction processing so that the apparatus can be commonly utilized in each store, an upper limit of an amount to be sold through a credit sale can be changed, and an account number for transfer in the same store can be changed.

Briefly described, the present invention is directed to a credit transaction processing of the data related to an entered commodity, based on the customer transaction data necessary for purchasing the merchant transaction commodity and the data necessary for credit sale, which are read out from a recording card owned by a customer and a recording medium owned by a store or shop.

Accordingly, in accordance with the present invention, a credit transaction processing can be performed based on the merchant transaction data necessary for a credit sale which is read out from the recording medium owned by a store, prior to customer transaction data being read out from a record card for a customer. Thus, by changing the merchant transaction data necessary for credit sale recorded in the recording medium owned by the store, flexibility of a credit transaction using a card of a customer can be obtained and the transaction apparatus can be commonly utilized in each store.

In a preferred embodiment of the present invention, the data representing an upper limit of an amount to be sold through a credit sale with respect to a particular customer is recorded as merchant transaction data in a recording medium owned by a store, so that a credit transaction processing can be inhibited if the data entered indicates a transaction exceeding the upper limit. Accordingly, in accordance with the preferred embodiment of the present invention, a credit transaction processing can be prevented if the price for commodities purchased by a customr exceeds an upper limit.

In addition, in another embodiment of the present invention, a plurality of recording mediums are provided, each having recorded therein different data representing a different upper limit of a permissible amount to be sold through a credit sale. Data representing an account number of a different banking institution utilized by the store is also stored. In making a credit transaction, the account number of a bank utilized by the store and/or the upper limit of the amount for a credit sale can be arbitrarily changed by selecting any one of several recording mediums owned by any store.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing the data stored in a memory shown in FIG. 1;

FIG. 3 is a diagram showing the data stored in a card owned by a store;

FIG. 4 is a diagram showing the data recorded in a card owned by a customer;

FIGS. 5A and 5B together constitute a flowchart operation of the credit transaction processing system;

FIG. 7 is a diagram explaining a system for selecting an account to be settled using a credit authorization terminal; and FIG. 8 is a diagram explaining a system for changing an upper limit of an amount to be sold through a credit sale using a credit authorization terminal.

DESCRIPTION OF THE PREFERRED EMBODIMENTS

Figure 1:
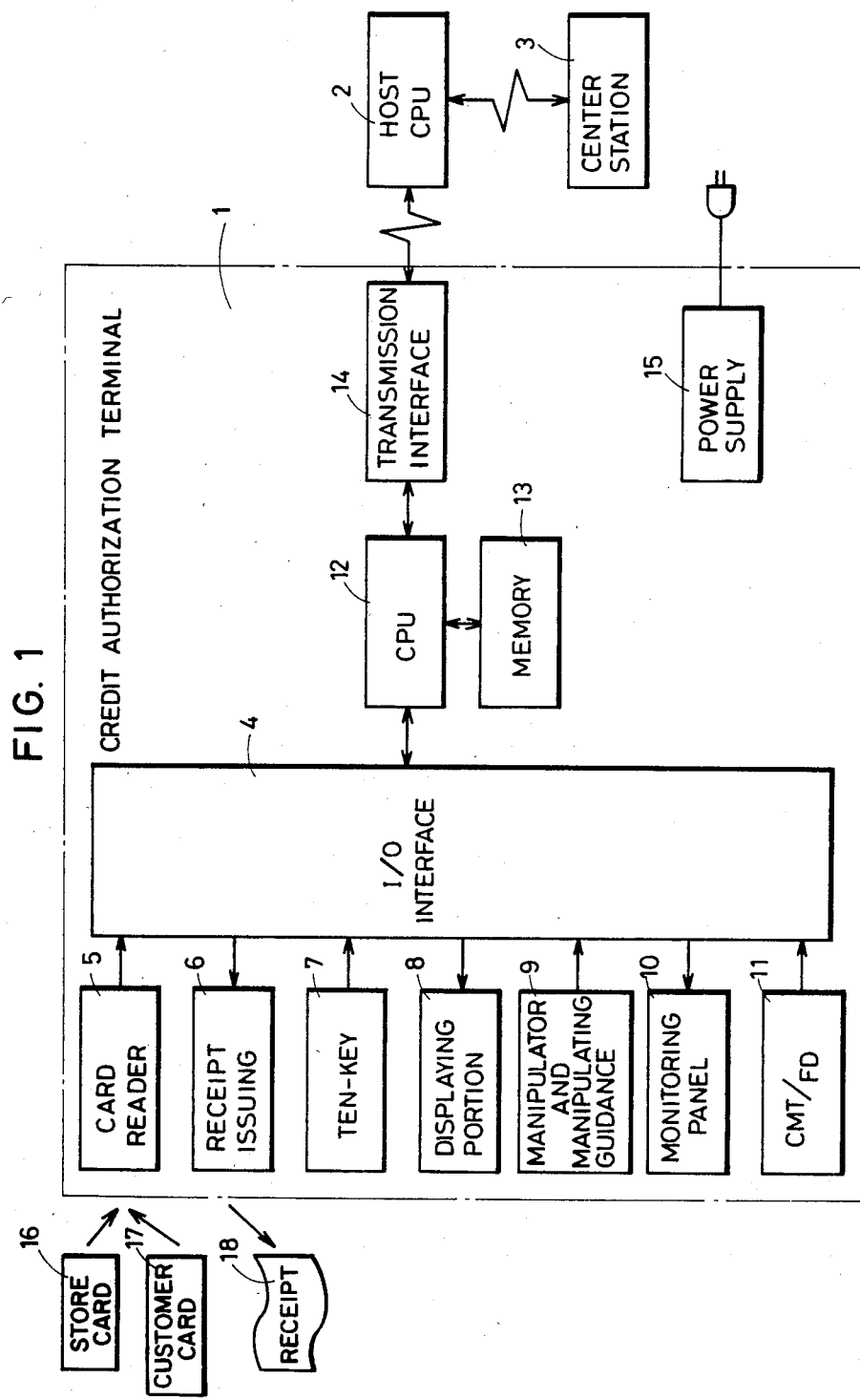
FIG. 1 is a schematic block diagram of a credit transaction processing system of an embodiment of the present invention.

FIG. 1 is a schematic block diagram of a credit transaction processing system of an embodiment of the present invention. As shown in FIG. 1, a construction of the system comprises a credit authorization terminal CAT1, a host central processing unit 2 and a center station 3 including a computing system of a bank and the like. Of these, for the host central processing unit 2 and the center station 3, a conventional on-line system can be utilized. The present invention resides in provision of a newly-developed credit authorization terminal CAT1, a card for a store, and a card for a customer used in the CAT1. The structure of the credit authorization terminal is shown in FIG. 1. That is, the credit authorization terminal CAT1 comprises an input-output (I/O) interface 4; a card reader 5, a receipt issuing apparatus 6, a ten-key 7, an amount displaying portion 8, a manipulator and manipulating guidance 9, a monitoring panel 10, a cassette type magnetic memory apparatus (CMT) or a floppy disk (FD) 11 all of which are connected to the interface 4; a central processing unit 12 connected to the interface 4; a memory 13 provided associated with the central processing unit 12; an interface 14 for transmission; and a power supply apparatus 15.

Now, the function of each constituent element will be briefly described. The card reader 5 reads merchant transaction data from card 16 and customer transaction data from card 17. As will become apparent below, "merchant transaction data" as used herein and in the appended claims comprises data typically required to process a credit transaction which is particular to a given merchant. Thus, it may include a merchant identification code, deposit account identification code, and an upper credit limit code. It will be apparent to one of ordinary skill in the art that additional or alternative data could serve as merchant transaction data. Similarly, "customer transaction data" refers to information typically required to process a credit transaction which is particular to a given customer, and would include, for example, a customer identification code. In the embodiment, although the card 16 is utilized as a recording medium owned by a store, a magnetic cassette tape and a magnetic recording disk and the like may also be used. The receipt issuing apparatus 6 issues a receipt 18 which is given to the customer when a credit sale is established. The ten-key 7 is an apparatus for entering any numerical data such as the data representing the price for commodities sold. The amount displaying portion 8 visually displays an upper limit of an amount to be sold through a credit sale, the amount of commodities sold, and the like. The manipulator and manipulating guidance 9 displays an operation procedure of the credit authorization terminal 1. The monitoring panel 10 indicates the information stored in the memory 13 and the like. A cassette type of magnetic recording apparatus or floppy disk records the data and information, such as the contents of the receipt 18 issued.

FIG. 2 is a diagram showing the data stored in the memory 13 of the credit authorization terminal 1 as shown in FIG. 1. The memory 13 includes an area 131 for storing at least the content recorded in the card owned by a store, a area 132 for storing an upper limit of an amount to be sold through a credit sale, an area 133 for storing a code representing a customer, and an area 134 for storing a sold amount.

FIGS. 3 and 4 show the merchant transaction data recorded in the card 16 for a store and the customer transaction data recorded in the card 17 for a customer, respectively.

As shown in FIG. 3, the merchant transaction data includes, for example, a code 162 indicating an account number of a banking institution, for example, a bank, utilized by the store (simply referred to as BK code hereinafter), a code 163 indicating an account number of a banking organ utilized by a credit company (referred to as C code hereinafter) and a code 164 indicating an upper limit of an amount to be sold through a credit sale (simply referred to as a credit sale code hereinafter), all recorded on card 16. The BK code 162, C code 163 and credit sale code 164 are such that the data stored therein can be changed in accordance with the kind 161 of the cards for a store. The store previously prepares and retains the plurality of cards, so that an account number of a bank utilized by the store and the upper limit of the amount to be sold through a credit sale can be arbitrarily changed by selecting a particular card from the plurality of cards used in making credit sales.

Further, as shown in FIG. 4, the customer transaction data includes, for example, a BK code 172 indicating an account number of a banking institution utilized by the customer, a C code 173 indicating an account number of a banking institution utilized by a credit company and an identification code 174, all recorded on card 17. The identification code 174 indicates the number specified for the purpose of preventing another customer from improperly utilizing the card. Thus, when the customer utilizes his card, it is preferable that he must first enter an identification number only he knows.

Figure 5B:
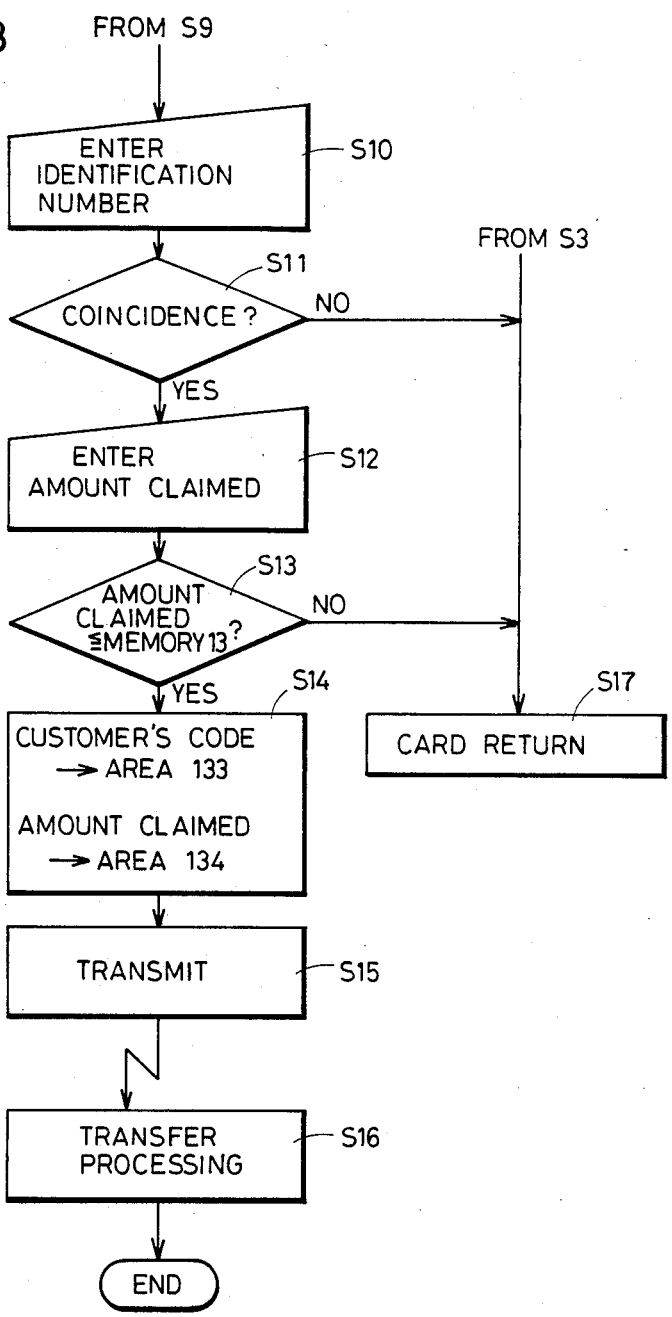

FIGS. 5A and 5B together make up a a flow diagram showing an operation of the credit sale transaction processing system. Referring to the flow diagram, an operation of the credit sale transaction processing system of FIG. 1 will be described.

In the step S1, it must be determined whether the condition necessary for a credit transaction is set by using a card 16 owned by a store. At the first time when a credit transaction is made, the condition necessary for credit transaction using the card 16 must be necessarily set. In the subsequent transactions, such setting of the conditions is not needed if the transaction is to be made on the same condition. In case where the transaction is made, setting of the condition would generally be made by selecting any one card from a plurality of cards by a head clerk or a responsible person of the store, considering the account to be settled, and the upper limit of the amount to be sold through a credit sale, since the condition necessary for credit transaction is different from each other depending on the kind of the cards owned by the store, as described in the foregoing. The selected card 16c is inserted into the card reader 5 in the credit authorization terminal 1 by an operator of the store, for example, so that the condition for credit transaction recorded in the card 16 is set. More particularly, when the card 16 is inserted in the card reader 5 for the purpose of setting the condition for credit transaction, the content (merchant transaction data) recorded in the card 16 is read out (step S2). Then, in the step S3, it is determined whether the content read out from the card 16 is valid or not. The determination is made in the central processing unit 12 by sending the content read out by the card reader 5 through the interface 4 into the central processing unit 12. If and when the content recorded in the card 16 is not valid, the card 16 is immediately returned in step S17 without performing any subsequent operation. If when the content in the card 16 is valid, the content in the card 16 is confirmed and then is stored in the storage area 131 in the memory 13 in the step S4.

In cases where the data indicating that the upper limit of the amount to be sold through a credit sale is not changed, for example, "0", is entered in the credit sale code 164 of the card 16 in the step S5, the upper limit of the amount, for example, $5,000 is stored in the upper limit of the amount storing area 132 of the memory 13 (step S6). Conversely, in case where the data indicating that the upper limit of the amount is to be changed, for example, "1", is entered in the credit sale code 164 in the card 16, a new upper limit of the amount to be sold through a credit sale, for example $10,000, is stored in the upper limit of the amount storing area 132 of the memory 13 in the step S7. The amount stored in the storage area 132, such as $5,000 or $10,000, becomes a maximum amount for a credit sale. After completion of these processing, the card 16 may be returned from the card reader 5.

The above described change of the upper limit of the amount to be sold through a credit sale is particularly advantageous in permitting the store to be flexible in extending credit irrespective of the kind of the commodity to be sold, the credit record of the customer, the amount being deposited in the bank, or, in cases where the price for commodities purchased by a customer exceeds the upper limit of the amount to be sold through a credit sale, given the store through a credit company.

In addition, in the present embodiment, although the change of the upper limit of the amount for a credit sale is made by changing the kind of the cards 16, such change may be made by entering an arbitrary amount by an operation of the ten-key 7, in which case the card 16 does not contain a credit sale code 164.

In case where the customer presents his card 17 for a credit sale, an operator in the store inserts the card 17 into the card reader 5 in the step S8. The card reader 5 reads the content (customer transaction data) recorded in the card 17 and, in the step S9, the central processing unit 12 determines whether the content read out from the card 17 is valid or not. If the content is invalid, then the card 17 is immediately ejected from the card reader 5 in step S17 without performing any subsequent operations. If the content read out from the card 17 is valid, an indication indicating that the customer's identification number should be entered is displayed in the manipulating guidance 9. Correspondingly, the operator in the store instructs the customer to enter numeric data corresponding to an identification number by the ten-key 7 (step S10). In the step S11, it is determined whether the identification number entered by the customer by means of the ten-key 7 coincides with an invisible identification number recorded in the customer's card 17 as part of the customer transaction data. If a coincidence occurs, the program proceeds to the step S12. If no coincidence occurs, the customer's card 17 is returned in step S17 without subsequent processing. After identifications are matched the customer, the operator enters numeric data indicating the purchase price (the "amount claimed") for the commodities and the like to be sold through a credit sale using the ten-key 7 and then instructs the customer to depress a confirmation button, not shown, (provided associated with the ten-key 7). This is to verify the operation so that an error may be avoided. Then, in the step S13, the amount claimed is compared with the upper limit of the amount to be sold through a credit sale, stored in the memory 13. In other words, it is determined whether the numeric data (the purchase price) satisfies a predetermined relationship (is less than) a quantity indicated by the merchant transaction data (the credit limit). If the amount claimed is lower than the upper limit, the customer's code is stored in the storage area 133 and at the same time, the amount claimed is stored in the amount storage area 134 in the step S14. These contents are transmitted from the transmission interface 14 to the host central processing unit 2, and then to the center station 3 in the step S15. Then, the transfer processing is made in the step 16 and then the processing of the credit transaction processing system and the operation thereof are terminated. The receipt 18 is issued from the receipt issuing apparatus 6 in the credit authorization terminal 1, which indicates that the transaction processing has been made.

Figure 6:
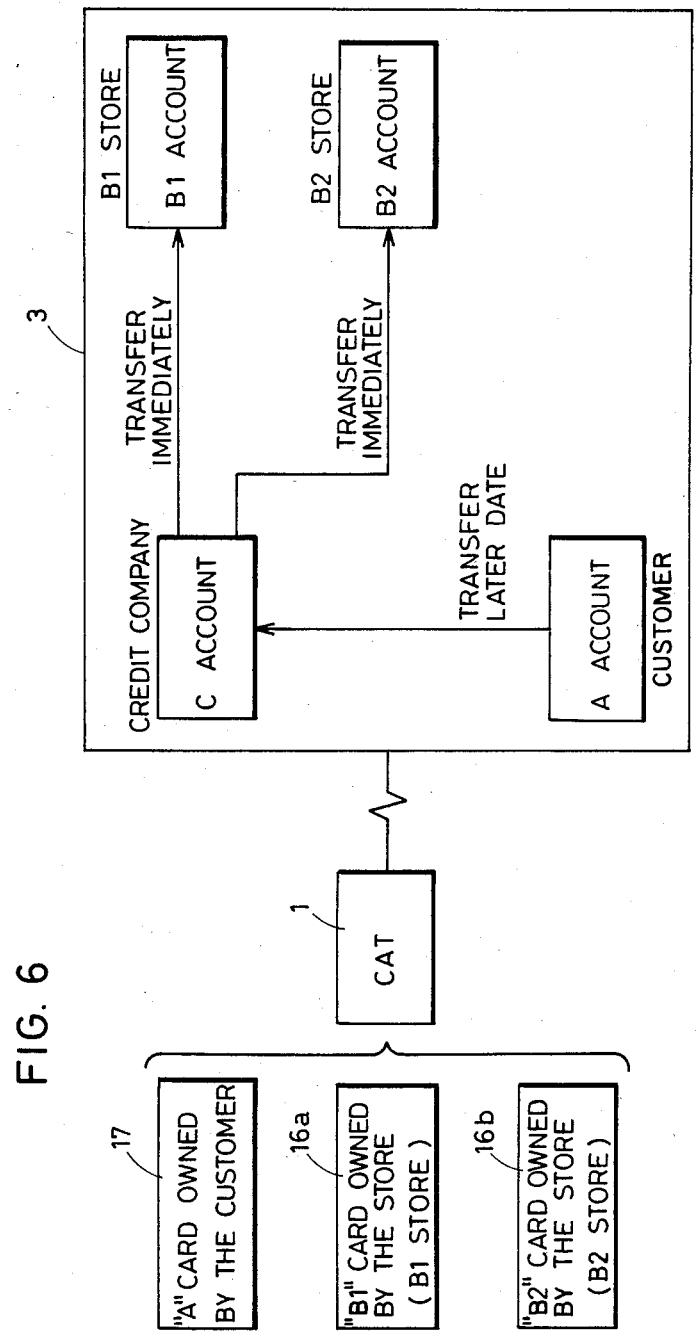
FIG. 6 is a diagram explaining a system for commonly using a credit authorization terminal.

FIGS. 6 to 8 are diagram for explaining a manner of utilizing the credit authorization terminal 1, respectively.

FIG. 6 is a diagram showing a system permitting two merchants to use credit authorization terminal 1. For example, two cards to be owned by a store, B1 card 16a and B2 card 16b, are prepared, the B1 card 16a having the data necessary for a credit sale in the B1 store recorded therein and the B2 card 16b having the data necessary for a credit sale in the B2 store recorded therein. In case where two stores B1 and B2 use a single credit authorization terminal 1, the B1 card 16a in the B1 store is inserted into the card reader 5 of the credit authorization terminal 1 and the operations in the steps S1 to S7 in FIGS. 5A and 5B are made, when a customer purchases commodities at the B1 store. Then, the A card 17 owned by the customer is inserted to the card reader 5 of the credit authorization terminal 1 and the data recorded therein is read out, so that the operations in the remaining steps in FIGS. 5A and 5B, that is, the steps S8 to S16, are made. Correspondingly, the credit authorization terminal 1 transmits data indicating the condition based on both of the data recorded in the B1 card and the A card to instruct the center station 3 to make the operation as shown in FIG. 6. More particularly, the amount required for a credit sale is immediately transferred from the C account of the credit company to the B1 account of the B1 store, while the amount for a credit sale, that is, the price for commodities purchased by the customer through a credit transaction, will be automatically transferred from the A account of the customer to the C account of the credit company on a predetermined later date. Conversely, in case where the B2 card 16b in the B2 store is first inserted into a card reader of the credit authorization terminal 1 and then the A card 17 of the customer is inserted, and each of the processings in the steps in FIG. 5 is made, the credit authorization terminal 1 instructs the center station 3 to transfer immediately the amount from the C account of the credit company to the B2 account of the B2 store. As described in the foregoing, since the recipient account is different for each store in the center station 3 by exchanging the store's card, a single credit authorization terminal can be shared with a plurality of stores.

Incidentally, besides the above-described embodiment, the center station to be called for may be selected depending on a store's card 16 so that settled processing may be made in another center station.

FIG. 7 is a diagram showing a system for selecting an account to be settled using a credit authorization terminal. In this system, the store has at least two cards, one being a B1 card 16c having a B1 account recorded therein, the other being a B2 card 16d having a B2 account recorded therein. For example, assuming that the store wishes to use the B1 account in response to the kind of commodities purchased by a customer, the B1 card 16c is entered to the credit authorization terminal T1 and then the A card 17 is entered, so that the operation of each of the steps shown in FIG. 5 is made. If the B1 card 16c is used, the transfer of the amount from the C account of the credit company to the B1 account of the B store is immediately performed in the center station 3. On the other hand, if and when the B2 card 16d is used, the transfer of the amount from the C account of the credit company to the B2 account of the B store is immediately performed in the center station 3. Thus, the destination account to which funds are to be transferred in the center station 3 can be arbitrarily changed.

Even in the case of FIG. 7, an alternative center station for final or settling processing may be selected in response to the card 16.

FIG. 8 is a diagram showing a system for changing an upper limit of the amount to be sold through a credit sale, using a credit authorization terminal. In FIG. 8, it is possible to give a store's service to a customer at the store's own risk, exceeding an upper limit of the amount to be sold through a credit sale given by a credit company, by selecting and using a single card from a plurality of cards the store has on hand. Thus, there is an advantage that the store can at its option obtain commodities at its own risk. In order to change the upper limit of the amount, it is possible to enter arbitrarily the upper limit by the ten-key 7, other than selecting and using a single card from the store's cards having the data of the upper limit stored therein.

The host central processing unit for performing settling operations is usually provided in the center station 3 and thus, in the above described embodiments of FIGS. 6 to 8, the settling processing is made in the same host central processing unit included in the center station 3.

However, in cases where any one or two of a credit company, a customer and a store, for example, have the account only in an alternative center station different from the above described center station 3, a data transmission is made between the host central processing unit of the center station 3 and the above-described alternate center station.

Although, in FIGS. 6 to 8, a settlement operation was made by using a banking system in the center station 3, such settlement may be made in the credit company itself. Alternatively, the present credit transaction processing apparatus can be utilized based on the relation among a bank, a store and a customer, excluding a credit company, so that the function to be performed by a credit company can be performed instead by a store or a bank.

It should be understood that the commodity and the like which is an object of the present credit transaction processing apparatus includes money itself.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A credit transaction processing system comprising:
 a credit authorization terminal having a card receiving means;
 a first card adapted to be insertable into said card receiving means;
 first recording medium means provided on said first card for storing merchant transaction data, said merchant transaction data including data indicating a maximum permitted amount of credit purchase and a plurality of account numbers respectively identifying merchant accounts into which funds may be electronically transferred;
 a second card adapted to be insertable into said card receiving means;
 second recording medium means provided on said second card for storing customer transaction data;
 keypad means provided on said credit authorization terminal for inputting numeric data;

reader means provided in said credit authorization terminal for reading said merchant transaction data from said first card when said first card is inserted in said receiving means and for reading said customer transaction data from said second card when said second card is inserted in said receiving means;

processing means, responsively connected to said keypad means and said reader means, for determining whether said numeric data satisfies a predetermined relationship with one of said merchant and customer transaction data.

2. A credit transaction processing system in accordance with claim 1, wherein said numeric data includes data indicating a requested amount of a credit purchase, and wherein said processing means includes means for inhibiting data processing when the requested amount exceeds the maximum amount.

3. A credit transaction processing system in accordance with claim 1, wherein said processing means includes means for authorizing an electronic fund transfer to a selected one of said accounts.

4. A credit transaction processing system in accordance with claim 1, wherein said processing means is further for formatting selected portions of said numeric data, customer transaction data, and merchant transaction data into formatted data and for transmitting said formatted data to a remote location.

5. A method of processing transaction data comprising the steps of:
(a) reading merchant transaction data in a credit authorization terminal from a first recording medium provided on a first card, said merchant transaction data including data indicating a maximum permitted amount of credit purchase and a plurality of account numbers respectively identifying merchant accounts into which funds may be electronically transferred;
(b) reading customer transaction data in said credit authorization terminal from a second recording medium provided on a second card;
(c) obtaining numeric data from a keypad data entry device;
(d) after said steps (a), (b) and (c), determining whether said numeric data satisfies a predetermined relationship with one of said merchant transaction data and said customer transaction data, including determining whether said amount of requested credit is less than said maximum credit limit; and
(e) formatting selected portions of said numeric data, merchant transaction data, and customer transaction data, to generate formatted data, and transmitting said formatted data to a remote location.

* * * * *